United States Patent
Dow et al.

(10) Patent No.: US 7,642,754 B2
(45) Date of Patent: Jan. 5, 2010

(54) METHOD OF FORMING A VOLTAGE REGULATOR AND STRUCTURE THEREFOR

(75) Inventors: Stephen W. Dow, Austin, TX (US);
Praveen Manapragada, Round Rock, TX (US); David F. Moeller, Buda, TX (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 353 days.

(21) Appl. No.: 11/448,881

(22) Filed: Jun. 8, 2006

(65) Prior Publication Data
US 2007/0285075 A1 Dec. 13, 2007

(51) Int. Cl.
*H02J 7/00* (2006.01)

(52) U.S. Cl. .................... 320/166; 323/238; 323/271

(58) Field of Classification Search ............. 320/166, 320/167; 323/238, 901, 274, 271, 282, 284; 363/49
See application file for complete search history.

(56) References Cited

U.S. PATENT DOCUMENTS

| | | | | |
|---|---|---|---|---|
| 4,038,604 A | * | 7/1977 | Koerber | 375/217 |
| 4,370,619 A | * | 1/1983 | Rijckaert | 327/12 |
| 4,404,527 A | * | 9/1983 | Schertz et al. | 381/109 |
| 4,542,330 A | * | 9/1985 | Terbrack | 323/222 |
| 4,686,432 A | * | 8/1987 | Berland et al. | 315/403 |
| 4,906,996 A | * | 3/1990 | George | 341/118 |
| 5,001,683 A | * | 3/1991 | Fukumoto et al. | 368/113 |
| 5,079,453 A | * | 1/1992 | Tisinger et al. | 327/132 |
| 5,432,474 A | * | 7/1995 | Lauffenburger et al. | 330/252 |
| 5,627,739 A | * | 5/1997 | Yung-Chow et al. | 363/60 |
| 5,659,387 A | * | 8/1997 | Yoshida | 356/4.01 |
| 5,862,045 A | * | 1/1999 | Halamik et al. | 363/97 |
| 6,171,252 B1 | * | 1/2001 | Roberts | 600/485 |
| 6,323,623 B1 | * | 11/2001 | Someya et al. | 320/166 |
| 6,420,858 B1 | * | 7/2002 | Kitagawa et al. | 323/282 |
| 7,129,800 B2 | * | 10/2006 | Gauthier et al. | 331/175 |
| 7,157,892 B1 | * | 1/2007 | Ritter | 323/284 |
| 7,279,941 B2 | * | 10/2007 | Yonezawa et al. | 327/101 |
| 2004/0011777 A1 | * | 1/2004 | Richlen | 219/204 |
| 2005/0134281 A1 | * | 6/2005 | Zhu et al. | 324/380 |
| 2006/0001407 A1 | * | 1/2006 | Suzuki | 323/274 |
| 2006/0017424 A1 | * | 1/2006 | Wood | |
| 2006/0176119 A1 | * | 8/2006 | Yonezawa et al. | 331/113 R |
| 2007/0103127 A1 | * | 5/2007 | Liu et al. | 323/273 |
| 2007/0114951 A1 | * | 5/2007 | Tsen et al. | 315/291 |
| 2007/0205824 A1 | * | 9/2007 | Perisetty | 327/536 |
| 2008/0136631 A1 | * | 6/2008 | Fluck | 340/551 |

* cited by examiner

*Primary Examiner*—Edward Tso
*Assistant Examiner*—Arun Williams
(74) *Attorney, Agent, or Firm*—Robert F. Hightower

(57) ABSTRACT

In one embodiment, a voltage regulator uses a first current to charge a by-pass capacitor for a first time period and uses a second current after the first time period.

20 Claims, 2 Drawing Sheets

METHOD OF FORMING A VOLTAGE REGULATOR AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures to form linear voltage regulators that regulated an output voltage. The voltage regulators sampled the output voltage and used an error amplifier to regulate the sampled voltage to the value of a reference voltage. In some types of voltage regulators, a bypass capacitor was connected to the reference voltage at an input to the error amplifier in order to reduce noise on the reference voltage. The bypass capacitor often had a very large value which required a large amount of time for the voltage regulator to initially form the reference voltage, thus, a large amount of time was required for the voltage regulator to start-up. The long start-up time usually was an undesirable feature Accordingly, it is desirable to have a voltage regulator that has a reduced start-up time.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
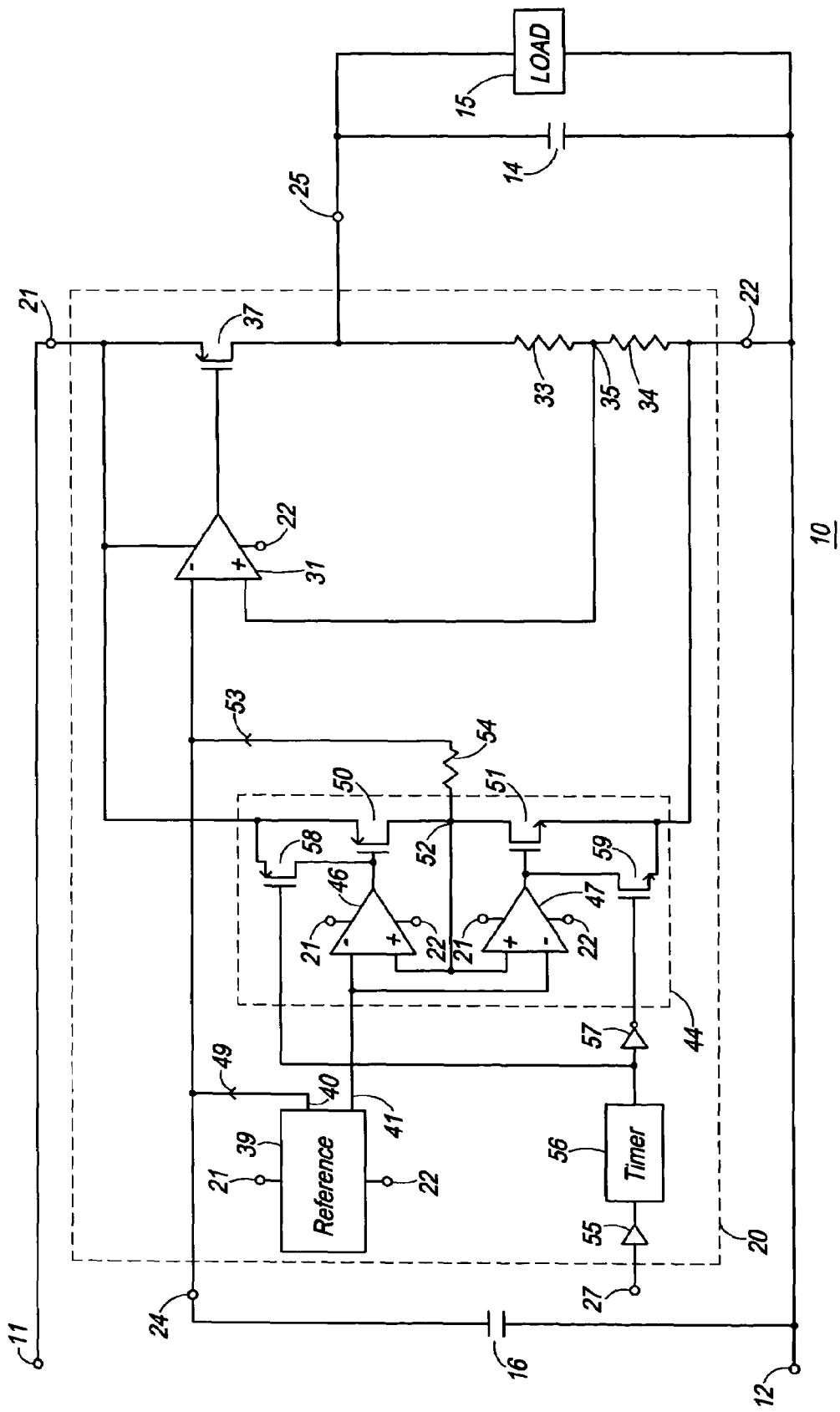
FIG. 1 schematically illustrates an embodiment of a portion of a power supply system having a voltage regulator in accordance with the present invention.

FIG. 1 schematically illustrates an embodiment of a portion of a power supply system 10 that includes an exemplary form of a voltage regulator 20 that has a reduced start-up time. As will be seen further hereinafter, regulator 20 is configured to use a first charging current to charge a bypass capacitor 16 during a first time period and to use a second charging current to charge capacitor 16 for a second time period after the first time period has expired. The value of capacitor 16 generally is in the range of about five to one hundred (5-100) nanofarads. System 10 receives power from a DC voltage source between a power input terminal 11 and a power return terminal 12. The dc voltage source may be from a variety of well-known dc sources such as a full-wave rectified signal of a bulk input voltage from a household mains. Regulator 20 receives power from an input voltage between a voltage input 21 and a voltage return 22 that generally are connected to respective terminals 11 and 12. Regulator 20 forms a regulated output voltage on an output 25. A load 15 and a filter capacitor 14 generally are connected to output 25 to receive the regulated output voltage. Regulator 20 regulates the output voltage to a target value within a range of values around the target value. For example, the target value may be five volts (5v) and the range of values may be plus or minus five percent (5%) around the five volts.

Regulator 20 has a feedback control loop that includes an error amplifier 31, a pass transistor 37, and a feedback network formed from series connected resistors 33 and 34 that coupled between output 25 and return 22. Resistors 33 and 34 form a sense signal on a node 35 that is representative of the value of the output voltage. Regulator 20 usually includes an enable input 27 that receives an enable signal to enable and disable the operation of regulator 20. Regulator 20 may also include a bandgap reference generator or reference 39, an input buffer 55, a timer 56, an inverter 57, and an amplifier 44. Reference 39 generates a first reference voltage on an output 40 and a second reference voltage that is substantially equal to the first reference voltage on a second output 41. Amplifier 44 is configured to receive the second reference signal from reference 39 and a form a substantially equal third reference signal on the output of amplifier 44. Amplifier 44 is also configured to form a current 53 that rapidly charges capacitor 16 to substantially the value of the third reference signal, thus, substantially equal to the first reference signal from reference 39. The goal is to configure reference 39 and amplifier 44 so that the second and third reference signals are equal to the first reference signal. However, as is well known in the art there are always minor variances that prevent the gains from being identically equal. It is well established in the art that variances of up to about ten per cent (10%) are regarded as reasonable variances from the ideal goal of exactly equal. The exemplary embodiment of amplifier 44 illustrated in FIG. 1 includes a first transconductance amplifier 46, a second transconductance amplifier 47, a first driver transistor 50, a second driver transistor 51, and disable transistors 58 and 59.

When input 27 is low, regulator 20 is disabled and is prevented from regulating the output voltage. The low from input 27 forces the output of reference 39 low which prevents amplifier 31 from enabling transistor 37. The low from input 27 also negates the control signal on the output of timer 56 by forcing the output of reference 39 low. The low control signal enables transistor 58 and also enables transistor 59 through inverter 57. Enabling transistors 58 and 59 disables respective transistors 50 and 51 which prevents amplifier 44 from operating.

When input 27 goes high, reference 39 is enabled and provides the first and second reference signals on respective outputs 40 and 41. The high from input 27 also enables timer 56 to assert the control signal on the output of timer 56 for a first time period. In the exemplary embodiment, timer 56 asserts the control signal by forcing the control signal high, although other embodiments may force the control signal low to assert the control signal. Amplifier 44 receives the second reference signal from output 41 and generates the third reference signal and current 53. The length of the first time period is selected to ensure that current 53 can charge capacitor 16 substantially to the value of the first reference signal before the first time period expires. The high from timer 56 disables transistor 58 and also disables transistor 59 through inverter 51 to enable amplifier 44. Amplifiers 46 and 47 are connected in a common source configuration to drive respective transistors 50 and 51. In the preferred embodiment, amplifiers 46 and 47 are two-stage transconductance amplifiers that have a high gain, typically greater than one thousand (1000), and supply a current that is sufficient to control respective transistors 50 and 51 to generate current 53. Amplifiers 46 and 47 and transistors 50 and 51 are formed to supply current 53 at a value that is sufficient to charge capacitor 16 to a value that is substantially equal to the first reference signal in a time period that is less than the time that timer 56 asserts the control signal. Amplifier 44 typically charges capacitor 16 in less than sixty (60) micro-seconds. Enabling reference 39 also generates current 49 on output 40 to assist in charging capacitor 16. However, reference 39 is configured to limit the value of current 49 to a very small value that can maintain capacitor 16 charged after capacitor 16 is charged by current 53. A resistor 54 may be connected between output node or output 52 of amplifier 44 and input 24 in order to provide frequency compensation to improve the stability of the feedback loop of regulator 20.

After the first time period of timer 56 expires, timer 56 negates the control signal. The low from timer 56 enables transistors 58 and 59 which disables respective transistors 50 and 51 thereby disabling amplifier 44. Reference 39 remains enabled to supply current 49 and the first and second reference signals. Current 49 maintains the charge on capacitor 16 after amplifier 44 is disabled. Thus, forming current 53 to rapidly charge capacitor 16 for the first time period facilitates regulator 20 quickly forming the regulated voltage on output 25. Using lower value current 49 to maintain the reference signal on capacitor 16 reduces the power dissipation during the operation of and during any stand-by time of regulator 20. In the preferred embodiment, the value of the first reference signal is approximately six hundred milli-volts (600 mv), current 49 is no greater than approximately one (1) microamp, current 53 usually is greater than about ten (10) micro-amps and preferably is about ten (10) milli-amps, and the first time period is approximately seventy-five micro-seconds.

In order to assist in providing this functionality for regulator 20, input 27 is connected to the input of buffer 55 which has an output connected to an input of timer 56 and an input of reference 39. Reference 39 is connected between input 21 and return 22. First output 40 of reference 39 is connected to input 24, and second output 41 is connected to an input of amplifier 44. The output of timer 56 is commonly connected to an input of inverter 57 and a gate of transistor 58. An output of inverter 57 is connected to a gate of transistor 59. A source of transistor 58 is connected to input 21. A drain of transistor 58 is commonly to the output of amplifier 46 and a gate of transistor 50. A source of transistor 59 is connected to return 22 and a drain is commonly connected to the output of amplifier 47 and a gate of transistor 51. A source of transistor 50 is connected to the source of transistor 58 and a drain of transistor 50 is commonly connected to output 52, a non-inverting input of amplifier 46, a non-inverting input of amplifier 47, and a first terminal of resistor 54. A drain of transistor 51 is connected to output 52 and a source of transistor 51 is connected to the source of transistor 59. An inverting input of amplifier 46 is commonly connected to the input of amplifier 44 and the inverting input of amplifier 47. The second terminal of resistor 54 is commonly connected to input 24 and an inverting input of amplifier 31. An output of amplifier 31 is connected to a gate of transistor 37. A source of transistor 37 is connected to input 21 and a drain is connected to output 25. A first terminal of resistor 33 is connected to output 25 and a second terminal is commonly connected to node 35, a first terminal of resistor 34, and a non-inverting input of amplifier 31. Second terminal of resistor 34 is connected to return 22.

Figure 2:
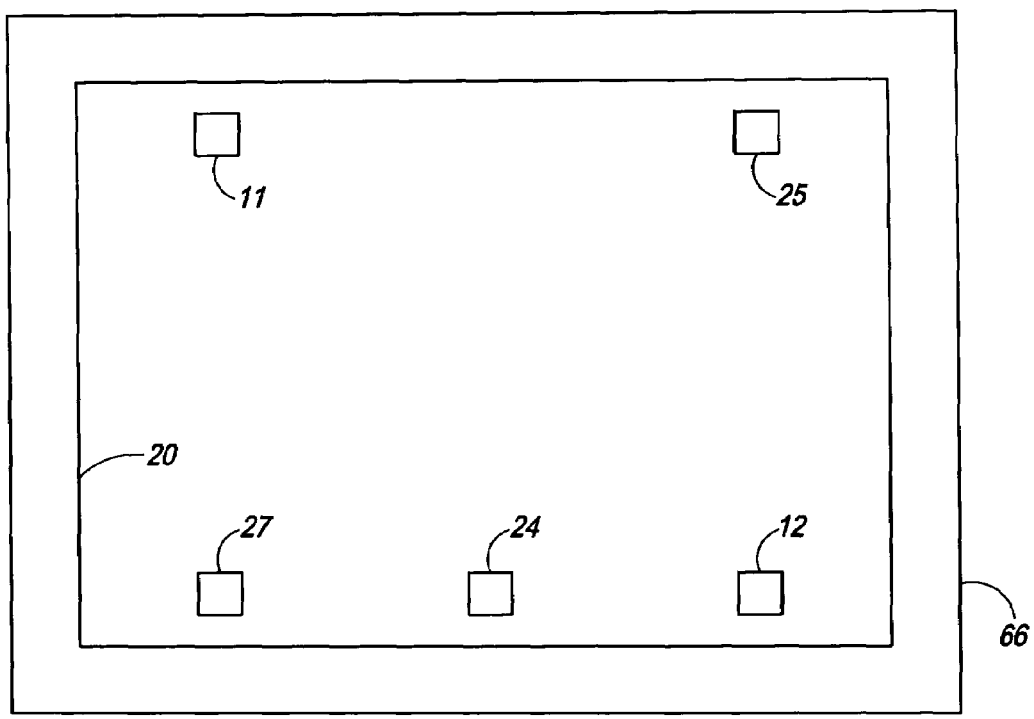
FIG. 2 schematically illustrates an enlarged plan view of a semiconductor device that includes the voltage regulator of FIG. 1 in accordance with the present invention.

FIG. 2 schematically illustrates an enlarged plan view of a portion of an embodiment of a semiconductor device or integrated circuit 65 that is formed on a semiconductor die 66. Regulator 20 is formed on die 66. Die 66 may also include other circuits that are not shown in FIG. 2 for simplicity of the drawing. Regulator 20 and device or integrated circuit 65 are formed on die 66 by semiconductor manufacturing techniques that are well known to those skilled in the art. In one embodiment, regulator 20 is formed on a semiconductor substrate as an integrated circuit having no more than six and preferably five external leads.

In view of all of the above, it is evident that a novel device and method is disclosed. Included, among other features, is forming regulator 20 to use two different current values to charge external capacitor 16. Using a large current to rapidly charge capacitor 16 and a smaller current to maintain the charge on capacitor 16 facilitates reducing the start-up time and also reducing the power dissipation of regulator 20.

While the subject matter of the invention is described with specific preferred embodiments, it is evident that many alternatives and variations will be apparent to those skilled in the semiconductor arts. For example, although amplifier 44 is configured as a class AB amplifier, other amplifier configurations may also be used as long as the amplifier provides a charging current is greater than the current supplied by the reference generator to charge the bypass capacitor. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A voltage regulator comprising:
an output configured to regulate an output voltage to a target value;
a first input configured for coupling to a capacitor and coupled to receive a reference signal having a value;
a charging circuit coupled to the first input and configured to charge the capacitor toward the value of the reference signal with a first current during a first time period and to charge the capacitor with a second current after the first time period wherein the first current is greater than the second current; and
an error amplifier coupled to simultaneously receive, during the second time period, the reference signal and a sense signal that is representative of the output voltage, and to responsively regulate the sense signal to approximately equal the reference signal.

2. The voltage regulator of claim 1 wherein the charging circuit includes a timer configured to assert a control signal for the first time period, and an amplifier coupled to receive the control signal and responsively form the first current.

3. The voltage regulator of claim 2 wherein the amplifier includes a pair of two stage transconductance amplifiers each of which drives a driver transistor.

4. The voltage regulator of claim 3 wherein the pair of two stage transconductance amplifiers are connected in a common source configuration.

5. The voltage regulator of claim 3 wherein a first two stage transconductance amplifier has a first input coupled to receive the reference signal, a second input coupled to an output of the amplifier, and an output coupled to a control electrode of a first output transistor; a second two stage transconductance amplifier has a first input coupled to receive the reference signal, a second input coupled to an output of the amplifier, and an output coupled to a control electrode of a second output transistor; the first output transistor includes a first current carrying electrode coupled to receive an input voltage and a second current carrying electrode coupled to the output of the amplifier; and the second output transistor includes a first current carrying electrode coupled to a voltage return and a second current carrying electrode coupled to the output of the amplifier.

6. The voltage regulator of claim 2 wherein the timer is configured to receive an enable signal and responsively assert the control signal.

7. The voltage regulator of claim 1 further including a reference generator configured to form the reference signal and supply the second current.

8. The voltage regulator of claim 7 wherein the reference generator forms another signal that is representative of the reference signal and the charging circuit is coupled to receive the another signal and form the first current.

9. The voltage regulator of claim 1 wherein the voltage regulator is formed on a semiconductor die having no more than six external connection terminals.

10. A method of forming a voltage regulator comprising:
configuring a reference circuit to generate a first reference signal;
configuring the voltage regulator to regulate an output voltage to a target value, to receive a sense signal that is representative of the output voltage, and to regulate the sense signal to be approximately equal to the first reference signal in order to regulate the output voltage to the desired value; and
configuring the voltage regulator to form a second reference signal that is representative of the first reference signal and to charge a reference output of the voltage regulator to the first reference signal at a first current value responsively to both the first and second reference signals for a first time period and to charge the reference output at a second current value responsively to the first reference signal but not the second reference signal for a second period of time.

11. The method of claim 10 wherein configuring the voltage regulator to form the second reference signal includes configuring the voltage regulator to form the first current value to be at least ten times the second current.

12. The method of claim 10 wherein configuring the voltage regulator to form the second reference signal includes configuring a timer to receive an enable signal and responsively assert a control signal for the first time period.

13. The method of claim 10 wherein configuring the voltage regulator to form the second reference signal includes configuring the voltage regulator to charge the reference output responsively to both the first and second reference signals for the first time period faster than the first reference signal can charge the reference output.

14. The method of claim 10 wherein configuring the voltage regulator to form the second reference signal that is representative of the first reference signal includes coupling first and second amplifiers in a common source configuration to form the first current value.

15. The method of claim 14 further including configuring a reference generator to form the first reference signal and couple a third reference signal that is representative of the first reference signal to the first and second amplifiers.

16. The method of claim 10 wherein configuring the voltage regulator to form the second reference signal that is representative of the first reference signal includes configuring the voltage regulator to charge the reference output of the voltage regulator to the first reference signal at the first current value responsively to both the first and second reference signals simultaneously for the first time period wherein the first current value is greater than the second current value.

17. A voltage regulator comprising:
a reference circuit configured to form a first reference signal and a second reference signal that is substantially equal to the first reference signal;
coupling an error amplifier to receive the first reference signal and regulate a voltage output of the voltage regulator to a target voltage value; and
coupling an amplifier to receive the second reference signal and charge a reference output of the voltage regulator substantially to the first reference signal during a first time period.

18. The voltage regulator of claim 17 wherein the amplifier includes two transconductance amplifiers coupled in a common source configuration.

19. The voltage regulator of claim 17 wherein a timer circuit asserts a control signal for the first time period and the amplifier charges the reference output responsively to the control signal.

20. The voltage regulator of claim 17 wherein the amplifier charges the reference output at a first current value for the first time period.

* * * * *

UNITED STATES PATENT AND TRADEMARK OFFICE
CERTIFICATE OF CORRECTION

PATENT NO. : 7,642,754 B2  Page 1 of 1
APPLICATION NO. : 11/448881
DATED : January 5, 2010
INVENTOR(S) : Dow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 564 days.

Signed and Sealed this

Sixteenth Day of November, 2010

David J. Kappos
*Director of the United States Patent and Trademark Office*